United States Patent
Shuai et al.

(10) Patent No.: US 12,236,056 B2
(45) Date of Patent: Feb. 25, 2025

(54) TOUCH DISPLAY DEVICE HAVING A CAPACITIVE TOUCH ELECTRODE AND ELECTROMAGNETIC TOUCH COIL

(71) Applicant: WUHAN CHINA STAR OPTOELECTRONICS SEMICONDUCTOR DISPLAY TECHNOLOGY CO., LTD., Hubei (CN)

(72) Inventors: Shuiqin Shuai, Hubei (CN); Zengjian Jin, Hubei (CN); Yalong Ma, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/758,012

(22) PCT Filed: May 20, 2022

(86) PCT No.: PCT/CN2022/094099
§ 371 (c)(1),
(2) Date: Jun. 26, 2022

(87) PCT Pub. No.: WO2023/216302
PCT Pub. Date: Nov. 16, 2023

(65) Prior Publication Data
US 2024/0192822 A1    Jun. 13, 2024

(30) Foreign Application Priority Data
May 12, 2022 (CN) .......................... 202210520551.5

(51) Int. Cl.
*G06F 3/046* (2006.01)
*G06F 3/044* (2006.01)

(52) U.S. Cl.
CPC ............ *G06F 3/046* (2013.01); *G06F 3/0441* (2019.05); *G06F 2203/04102* (2013.01); *G06F 2203/04107* (2013.01); *G06F 2203/04111* (2013.01)

(58) Field of Classification Search
CPC ....................................................... G06F 3/046
(Continued)

(56) References Cited

U.S. PATENT DOCUMENTS

2011/0181548 A1   7/2011   Sekiguchi
2012/0169400 A1*   7/2012   Liu ........................ G06F 3/0446
                                                            327/517
(Continued)

FOREIGN PATENT DOCUMENTS

CN    103543854 A    1/2014
CN    103941933 A    7/2014
(Continued)

OTHER PUBLICATIONS

International Search Report in International application No. PCT/CN2022/094099, mailed on Dec. 26, 2022.
(Continued)

*Primary Examiner* — Long D Pham
(74) *Attorney, Agent, or Firm* — PV IP PC; Wei Te Chung

(57) ABSTRACT

The present invention provides a touch display module and a touch display device; by integrating an electromagnetic touch electrode in the touch display module and placing the electromagnetic touch electrode and a capacitive touch electrode in different layers, the touch display module is compatible with capacitive touch and electromagnetic touch,
(Continued)

and at a same time, the electromagnetic touch and capacitive touch may not interfere with each other, and compared with back mounted electromagnetic induction modules in the prior art, a thickness of the touch display module can be reduced, and power consumption and manufacturing cost will not be increased.

20 Claims, 6 Drawing Sheets

(58) Field of Classification Search
 USPC .......................................................... 345/173
 See application file for complete search history.

(56) References Cited

U.S. PATENT DOCUMENTS

| | | | | |
|---|---|---|---|---|
| 2014/0022187 A1* | 1/2014 | Jeong | .................... | G06F 3/0446 |
| | | | | 345/173 |
| 2018/0136762 A1* | 5/2018 | Jeong | .................... | G06F 3/0445 |

FOREIGN PATENT DOCUMENTS

| | | | |
|---|---|---|---|
| CN | 204463063 U | 7/2015 | |
| CN | 107977100 A | 5/2018 | |
| CN | 113741730 A | 12/2021 | |
| WO | 2021213210 A1 | 10/2021 | |

OTHER PUBLICATIONS

Written Opinion of the International Search Authority in International application No. PCT/CN2022/094099, mailed on Dec. 26, 2022.

\* cited by examiner

TOUCH DISPLAY DEVICE HAVING A CAPACITIVE TOUCH ELECTRODE AND ELECTROMAGNETIC TOUCH COIL

BACKGROUND OF INVENTION

Field of Invention

The invention relates to a field of display technology, and particularly to a touch display module and a touch display device.

Description of Prior Art

Touch panels mainly adopt two touch methods of a finger touch and a touch pen touch. Wherein there are mainly two kinds of touch pens: capacitive pens and electromagnetic pens, and in terms of a writing effect, the electromagnetic pens have better writing effects than the capacitive pens, and are widely used in professional fields such as professional painting, industrial design, and garment design, etc.

Existing touch screens supporting the electromagnetic pens realize an electromagnetic touch by assembling and fitting an elector-magnetic resonance (EMR) module or an EMR antenna board on a back of a display module. Wherein the EMR module or the EMR antenna board is composed of horizontal and longitudinal staggered metal wires. When an electromagnetic pen moves on the touch screens, built-in resonance electrons or coils will accumulate weak power due to an electromagnetic induction, electromagnetic induction signals will be generated between the electromagnetic pen and induction coils of a touch screen, then a coordinate, an inclination, and an operation state of a touch pen can be calculated according to changes of the electromagnetic induction signals.

SUMMARY OF INVENTION

At present, in addition to higher and higher requirements for a finger touch, requirements for touch pens are getting higher and higher. If it is desired to achieve compatibility between electromagnetic pens and capacitive pens, current ways of assembling and fitting an elector-magnetic resonance (EMR) module or an EMR antenna board on a back of a display module will increase a thickness of a touch screen and increase power consumption and manufacturing cost of the touch screen. Although some schemes integrate electromagnetic touch coils into the touch screen, the electromagnetic touch coils and capacitive touch electrodes are generally disposed in a same layer for manufacturing convenience. However, Due to a limited space in the same layer, requirements for a manufacturing process are higher, and induction of the electromagnetic touch coils and the capacitive touch electrodes will interfere with each other, which to a certain extent cannot achieve a best effect of a touch effect of a finger or a capacitive pen and a touch effect of an electromagnetic pen. Therefore, it is necessary to propose a touch screen compatible with the capacitive pen and the electromagnetic pen, which can achieve best touch effects of the capacitive pen and the electromagnetic pen and does not increase thicknesses, power consumption, and manufacturing cost of products.

In order to solve above problems, embodiments of the invention provide a touch display module, which includes a touch layer and a flexible substrate disposed in different layers; wherein the touch layer includes a capacitive touch electrode, and the capacitive touch electrode is configured to determine a plane coordinate of a finger or a capacitive pen; and the flexible substrate includes an electromagnetic touch coil, and the electromagnetic touch coil is configured to determine a plane coordinate of an electromagnetic pen.

In some embodiments, the electromagnetic touch coil includes a first electromagnetic touch coil extending along a first direction and forming a loop and a second electromagnetic touch coil extending along a second direction and forming a loop, and the first direction and the second direction are perpendicular to each other; wherein one of the first electromagnetic touch coil and the second electromagnetic touch coil is a transmitting coil, and another one is a receiving coil.

In some embodiments, the flexible substrate includes a first flexible substrate layer and a second flexible substrate layer disposed in different layers; the first electromagnetic touch coil and the second electromagnetic touch coil are disposed in the first flexible substrate layer and the second flexible substrate layer respectively; or, the first electromagnetic touch coil and the second electromagnetic touch coil are both disposed in the first flexible substrate layer or the second flexible substrate layer.

In some embodiments, the capacitive touch electrode includes a first capacitive touch electrode extending along a first direction and a second capacitive touch electrode extending along a second direction, and the first direction and the second direction are perpendicular to each other; wherein one of the first capacitive touch electrode and the second capacitive touch electrode is a transmitting electrode, and another one is a receiving electrode.

In some embodiments, the first electromagnetic touch coil and the second electromagnetic touch coil are both disposed in the first flexible substrate layer, and a metal bridge used for insulating at an intersection of the first electromagnetic touch coil and the second electromagnetic touch coil is disposed in the second flexible substrate layer; or, the first electromagnetic touch coil and the second electromagnetic touch coil are both disposed in the second flexible substrate layer, and the metal bridge used for insulating at the intersection of the first electromagnetic touch coil and the second electromagnetic touch coil is disposed in the first flexible substrate layer.

In some embodiments, the flexible substrate further includes a bottom shielding metal layer disposed in a layer different from the first flexible substrate layer and the second flexible substrate layer; the first electromagnetic touch coil and the second electromagnetic touch coil are both disposed in the first flexible substrate layer or the second flexible substrate layer, and a metal bridge used for insulating at an intersection of the first electromagnetic touch coil and the second electromagnetic touch coil is disposed in the bottom shielding metal layer.

In some embodiments, when the first electromagnetic touch coil and the second electromagnetic touch coil are disposed in the first flexible substrate layer and the second flexible substrate layer respectively, the first electromagnetic touch coil and the second electromagnetic touch coil are prepared by two different masks.

In some embodiments, when the first electromagnetic touch coil and the second electromagnetic touch coil are both disposed in the first flexible substrate layer or the second flexible substrate layer, the first electromagnetic touch coil and the second electromagnetic touch coil are prepared by a same mask, and the metal bridge is prepared by another mask.

In some embodiments, materials of the capacitive touch electrode and the electromagnetic touch coil are both indium tin oxide.

In addition, the embodiments of the invention further provide a touch display device, including a touch display module, which includes a touch layer disposed in different layers and a flexible substrate; wherein
- the touch layer includes a capacitive touch electrode, and the capacitive touch electrode is configured to determine a plane coordinate of a finger or a capacitive pen; and
- the flexible substrate includes an electromagnetic touch coil, and the electromagnetic touch coil is configured to determine a plane coordinate of an electromagnetic pen.

In some embodiments, the capacitive touch electrode includes a first capacitive touch electrode extending along a first direction and a second capacitive touch electrode extending along a second direction, and the first direction and the second direction are perpendicular to each other; wherein one of the first capacitive touch electrode and the second capacitive touch electrode is a transmitting electrode, and another one is a receiving electrode.

In some embodiments, the electromagnetic touch coil includes a first electromagnetic touch coil extending along a first direction and forming a loop and a second electromagnetic touch coil extending along a second direction and forming a loop, and the first direction and the second direction are perpendicular to each other; wherein one of the first electromagnetic touch coil and the second electromagnetic touch coil is a transmitting coil, and another one is a receiving coil.

In some embodiments, the flexible substrate includes a first flexible substrate layer and a second flexible substrate layer disposed in different layers;
- the first electromagnetic touch coil and the second electromagnetic touch coil are disposed in the first flexible substrate layer and the second flexible substrate layer respectively; or, the first electromagnetic touch coil and the second electromagnetic touch coil are both disposed in the first flexible substrate layer or the second flexible substrate layer.

In some embodiments, the first electromagnetic touch coil and the second electromagnetic touch coil are both disposed in the first flexible substrate layer, and a metal bridge used for insulating at an intersection of the first electromagnetic touch coil and the second electromagnetic touch coil is disposed in the second flexible substrate layer; or, the first electromagnetic touch coil and the second electromagnetic touch coil are both disposed in the second flexible substrate layer, and the metal bridge used for insulating at the intersection of the first electromagnetic touch coil and the second electromagnetic touch coil is disposed in the first flexible substrate layer.

In some embodiments, the flexible substrate further includes a bottom shielding metal layer disposed in a layer different from the first flexible substrate layer and the second flexible substrate layer;
- the first electromagnetic touch coil and the second electromagnetic touch coil are both disposed in the first flexible substrate layer or the second flexible substrate layer, and a metal bridge used for insulating at an intersection of the first electromagnetic touch coil and the second electromagnetic touch coil is disposed in the bottom shielding metal layer.

In some embodiments, when the first electromagnetic touch coil and the second electromagnetic touch coil are disposed in the first flexible substrate layer and the second flexible substrate layer respectively, the first electromagnetic touch coil and the second electromagnetic touch coil are prepared by two different masks.

In some embodiments, when the first electromagnetic touch coil and the second electromagnetic touch coil are both disposed in the first flexible substrate layer or the second flexible substrate layer, the first electromagnetic touch coil and the second electromagnetic touch coil are prepared by a same mask, and the metal bridge is prepared by another mask.

In some embodiments, materials of the capacitive touch electrode and the electromagnetic touch coil are both indium tin oxide.

In the touch display module and the touch display device provided by the embodiments of the invention, the capacitive touch electrode is disposed in the touch layer, the electromagnetic touch coil is disposed in the flexible substrate disposed in the different layer from the touch layer. Wherein the plane coordinate of the finger or the capacitive pen can be determined through the capacitive touch electrode, and the plane coordinate of the electromagnetic pen can be determined through the electromagnetic touch coil, so as to integrate the electromagnetic touch electrode into the touch display module, and dispose the electromagnetic touch electrode in a different layer from the capacitive touch electrode, so that the touch display module is compatible with a capacitive touch and an electromagnetic touch, and at a same time, the electromagnetic touch and capacitive touch can not interfere with each other. And compared with back mounted electromagnetic resonance modules in the prior art, a thickness of the touch display module can be reduced, and the power consumption and the manufacturing cost will not be increased.

DETAILED DESCRIPTION OF EMBODIMENTS

In order to make a purpose, technical schemes and effects of the present application more clear and definite, the present application will be further described in detail with reference to attached drawings and examples. It should be understood that specific embodiments described herein are only used to explain the present application and are not used to limit the present application.

Figure 1:
FIG. 1 is a schematic structural diagram of a touch display module provided by an embodiment of the present invention.

As shown in FIG. 1, an embodiment of the present invention provides a touch display module, which includes a touch layer 10 and a flexible substrate 20 disposed in different layers; wherein the touch layer 10 includes a capacitive touch electrode, and the capacitive touch electrode is configured to determine a plane coordinate of a finger or a capacitive pen; and the flexible substrate 20 includes an electromagnetic touch coil, and the electromagnetic touch coil is configured to determine a plane coordinate of an electromagnetic pen.

Specifically, a film layer structure of the touch display module provided by the embodiment of the present invention includes the touch layer 10 and the flexible substrate 20 disposed in different layers, the capacitive touch electrode used for sensing an action of the finger or the capacitive pen to determine the plane coordinate of the finger or the capacitive pen is disposed in the touch layer 10, and the electromagnetic touch coil used for sensing an action of the electromagnetic pen to determine the plane coordinate of the electromagnetic pen is disposed in the flexible substrate 20. Therefore, by integrating the electromagnetic touch electrode into the touch display module, and placing the electromagnetic touch electrode in the different layer from the capacitive touch electrode, the touch display module is compatible with capacitive touch and electromagnetic touch, and at a same time, the electromagnetic touch and capacitive touch may not interfere with each other. And compared with back mounted electromagnetic induction module in the prior art, a thickness of the touch display module is reduced, and power consumption and manufacturing cost will not be increased.

It should be noted that in order to increase an aperture ratio of the touch display module, materials of the capacitive touch electrode and the electromagnetic touch coil are both transparent indium tin oxide.

Figure 3:
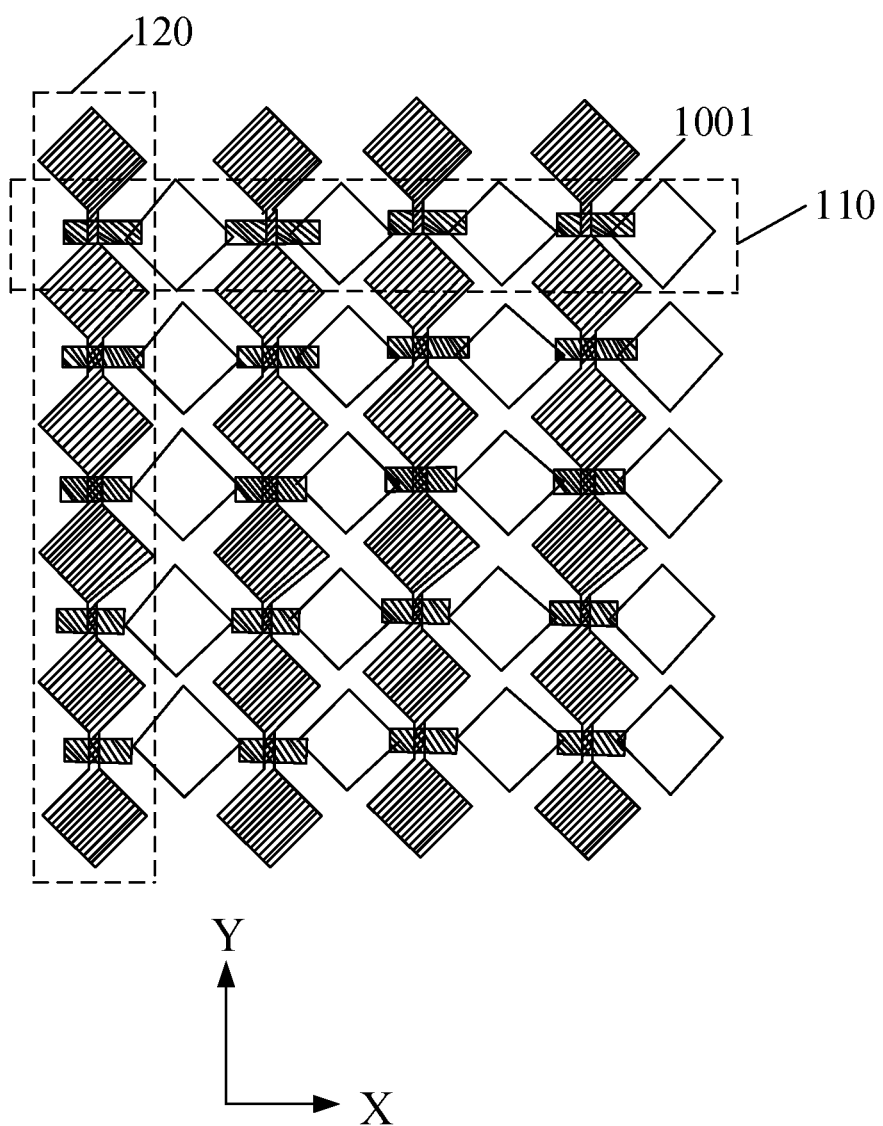
FIG. 3 is a top view of a touch layer of the touch display module provided by the embodiment of the present invention.

As shown in FIG. 3, in some embodiments, the capacitive touch electrode includes a first capacitive touch electrode 110 extending along a first direction and a second capacitive touch electrode 120 extending along a second direction, and the first direction and the second direction are perpendicular to each other. Wherein one of the first capacitive touch electrode 110 and the second capacitive touch electrode 120 is a transmitting electrode, and another one is a receiving electrode.

Specifically, when the first direction is an X direction and the second direction is a Y direction, the touch layer 10 includes a plurality of patterned first capacitive touch electrodes 110 disposed along the Y direction and a plurality of second capacitive touch electrodes 120 disposed along the X direction. The first capacitive touch electrode 110 and the second capacitive touch electrode 120 are connected to each other through a plurality of capacitive connection electrodes 1001 spaced apart. When the touch layer 10 adopts a mutual-capacitive touch, a mutual capacitance is formed at an intersection of the first capacitive touch electrode 110 and the second capacitive touch electrode 120. When a finger or a capacitive pen touches the touch display module, coupling between the first capacitive touch electrode 110 and the second capacitive touch electrode 120 near the mutual capacitance is affected, thereby changing a capacitance value of the mutual capacitance. When the capacitance value of the mutual capacitance is detected, the first capacitive touch electrode 110 can be used as the transmitting electrode to output an excitation signal, and the second capacitive touch electrode 120 can be used as the receiving electrode to receive the signal. In this way, the capacitance value of the mutual capacitance can be obtained, so as to determine the plane coordinate of the finger or a touch point of the capacitive pen.

It should be noted that the touch layer 10 of the embodiment of the present invention can also adopt a self-capacitive touch, that is, the capacitive touch electrode is grounded to detect an amount of change in capacitance of the first capacitive touch electrode 110 and the second capacitive touch electrode 120, respectively, so as to determine an X coordinate and a Y coordinate of the touch point, respectively, and finally determine the plane coordinate of the touch point.

Figure 4:
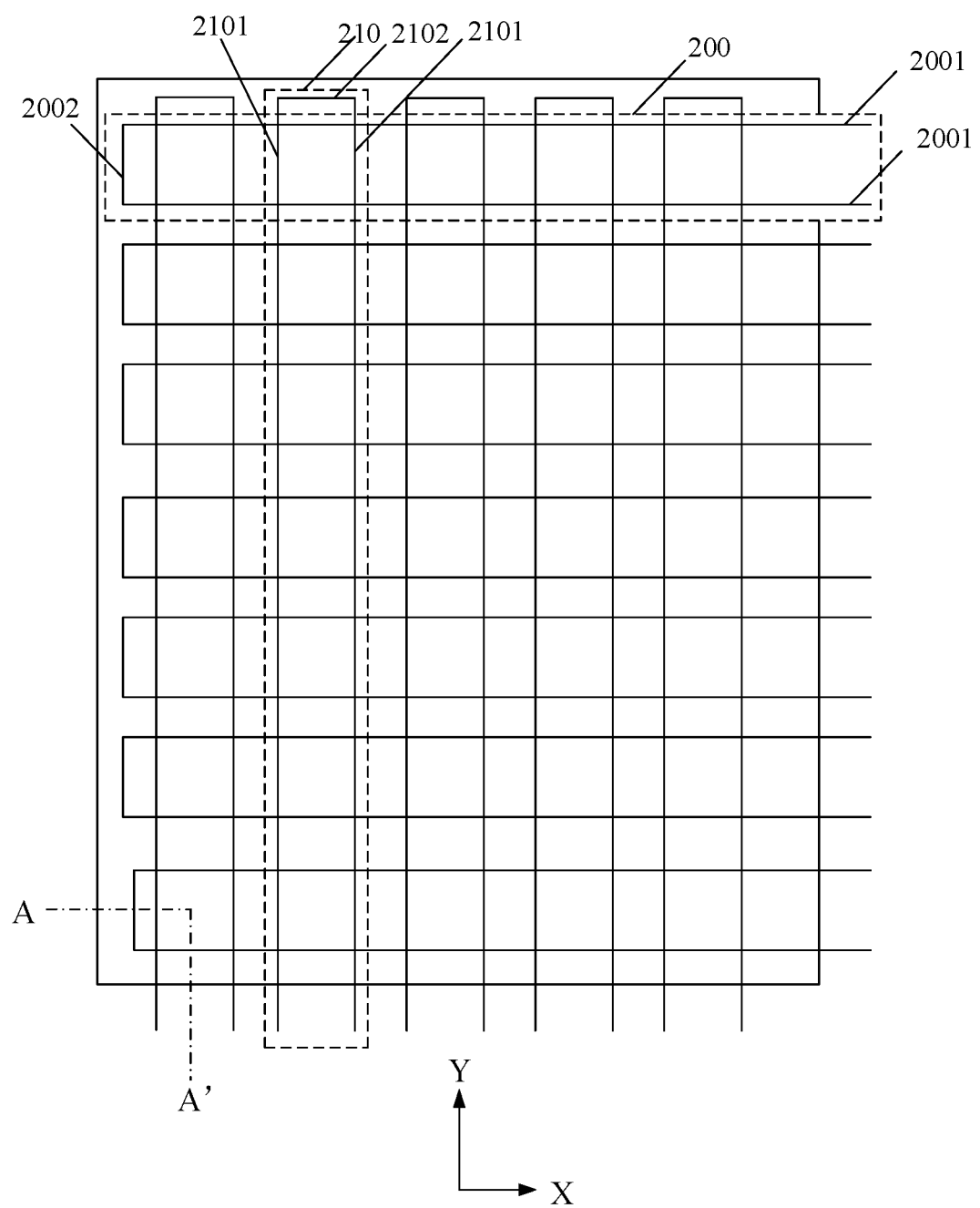
FIG. 4 is a top view of a flexible substrate of the touch display module provided by the embodiment of the present invention.

As shown in FIG. 4, in some embodiments, the electromagnetic touch coil includes a first electromagnetic touch coil 200 extending along the first direction and forming a loop and a second electromagnetic touch coil 210 extending along the second direction and forming a loop, and the first direction and the second direction are perpendicular to each other; wherein one of the first electromagnetic touch coil 200 and the second electromagnetic touch coil 210 is a transmitting coil, and another one is a receiving coil.

Specifically, when the first direction is the X direction and the second direction is the Y direction, the flexible substrate 20 includes a plurality of patterned first electromagnetic touch coils 200 extending along the X direction and forming a loop and a plurality of second electromagnetic touch coils 210 extending along the Y direction and forming a loop, that is, each of the first electromagnetic touch coils 200 includes two first electromagnetic touch electrodes 2001 disposed in the X direction and a first electromagnetic connection electrode 2002 disposed in the Y direction used for connecting the two first electromagnetic touch electrodes 2001, and each of the second electromagnetic touch coil 210 includes two second electromagnetic touch electrodes 2101 disposed along the Y direction and a second electromagnetic connection electrode 2102 disposed along the X direction used for connecting the two second electromagnetic touch electrodes 2101. Wherein the first electromagnetic touch coil 200 and the second electromagnetic touch coil 210 are insulated from each other, and the first electromagnetic touch coil 200 can be used as the transmitting electrode to output an excitation signal, and the second electromagnetic touch coil 210 can be used as the receiving coil to receive the signal. In this way, the plane coordinate of the electromagnetic pen can be determined through electromagnetic induction signals among the first electromagnetic touch coil 200, the second electromagnetic touch coil 210, and the electromagnetic pen.

Figure 2:
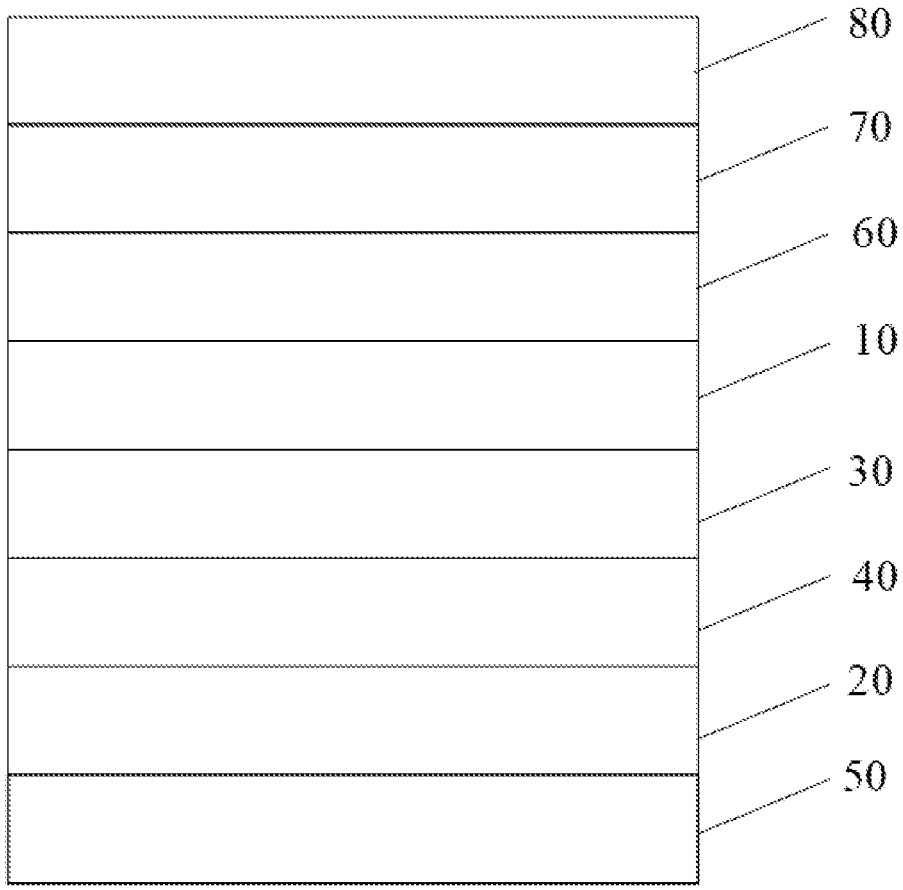
FIG. 2 is another schematic structural diagram of the touch display module provided by the embodiment of the present invention.

Further, as shown in FIG. 2, in some embodiments, the touch display module further includes a packaging layer 30 and a light emitting layer 40 disposed between the touch layer 10 and the flexible substrate 20, wherein the packaging layer 30 is disposed on a side of the touch layer 10 close to the flexible substrate 20, and the light emitting layer 40 is disposed on a side of the flexible substrate 20 close to the touch layer 10.

In addition, the touch display module further includes an upper polarizer 60, a liquid optical adhesive 70, and a cover 80 sequentially disposed above the touch layer 10, and an ultra-clean foam composite film 50 disposed below the flexible substrate 20. Wherein the cover 80 and the upper polarizer 60 are attached with each other through the liquid optical adhesive 70, and the ultra-clean foam composite film 50 can play a buffer effect on stresses acting on the touch display module and dissipate heat generated during an operation of the touch display module, which has a certain protective effect on the touch display module.

Further, as shown in FIG. 5 to FIG. 9, in some embodiments, the flexible substrate 20 includes a first flexible substrate layer 201 and a second flexible substrate layer 202 disposed in different layers; the first electromagnetic touch coil 200 and the second electromagnetic touch coil 210 are disposed in the first flexible substrate layer 201 and the second flexible substrate layer 202, respectively; or, the first electromagnetic touch coil 200 and the second electromagnetic touch coil 210 are both disposed in the first flexible substrate layer 201 or the second flexible substrate layer 202.

Figure 5:
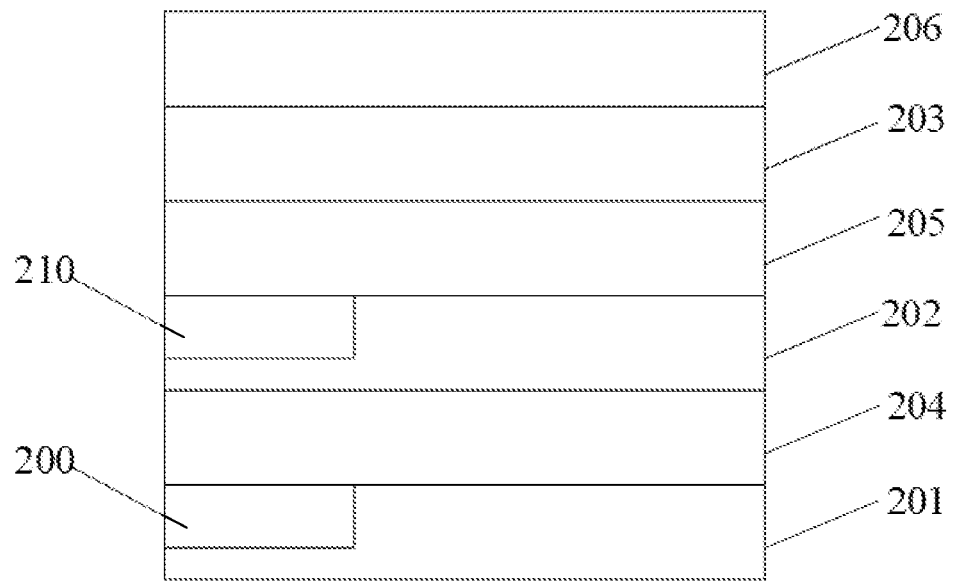
FIG. 5 is a first sectional view along A-A' of the flexible substrate of FIG. 4.
Figure 6:
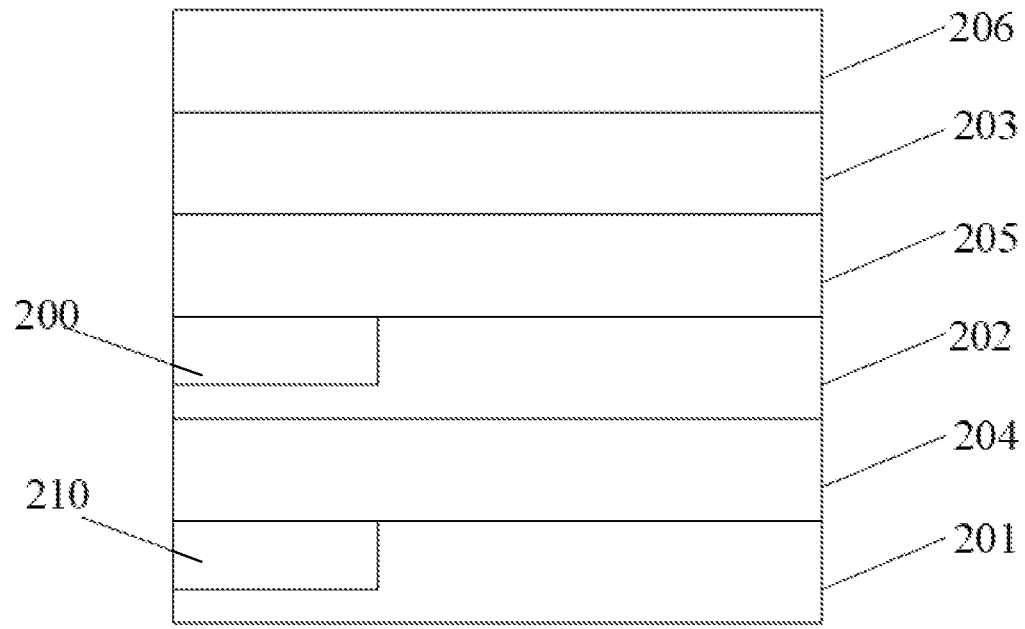
FIG. 6 is a second sectional view along A-A' of the flexible substrate of FIG. 4.
Figure 7:
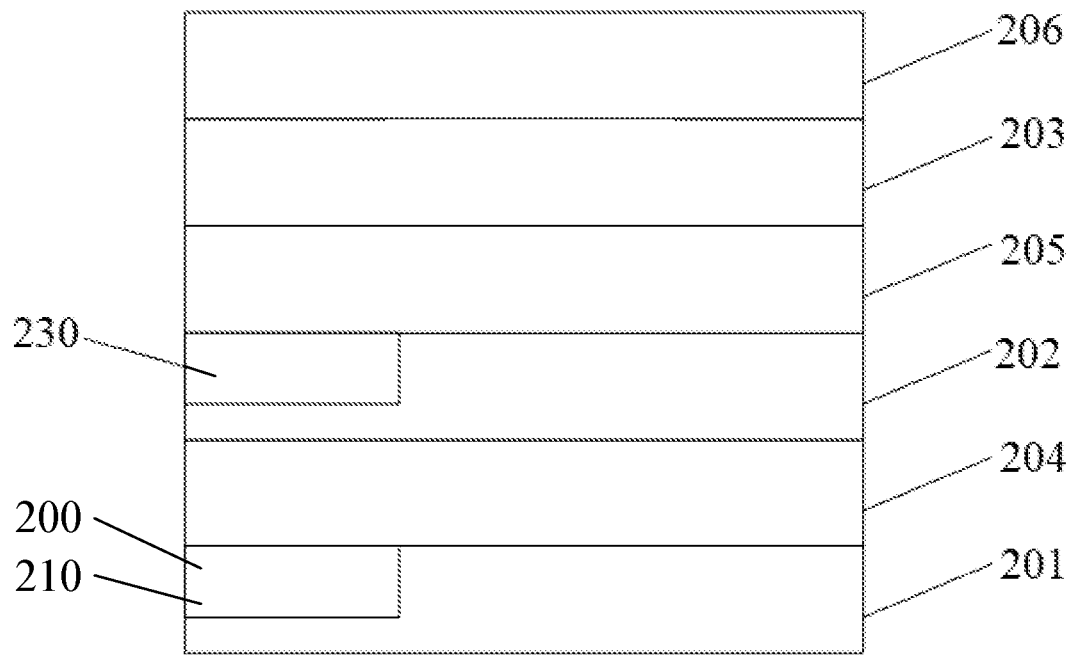
FIG. 7 is a third sectional view along A-A' of the flexible substrate of FIG. 4.
Figure 8:
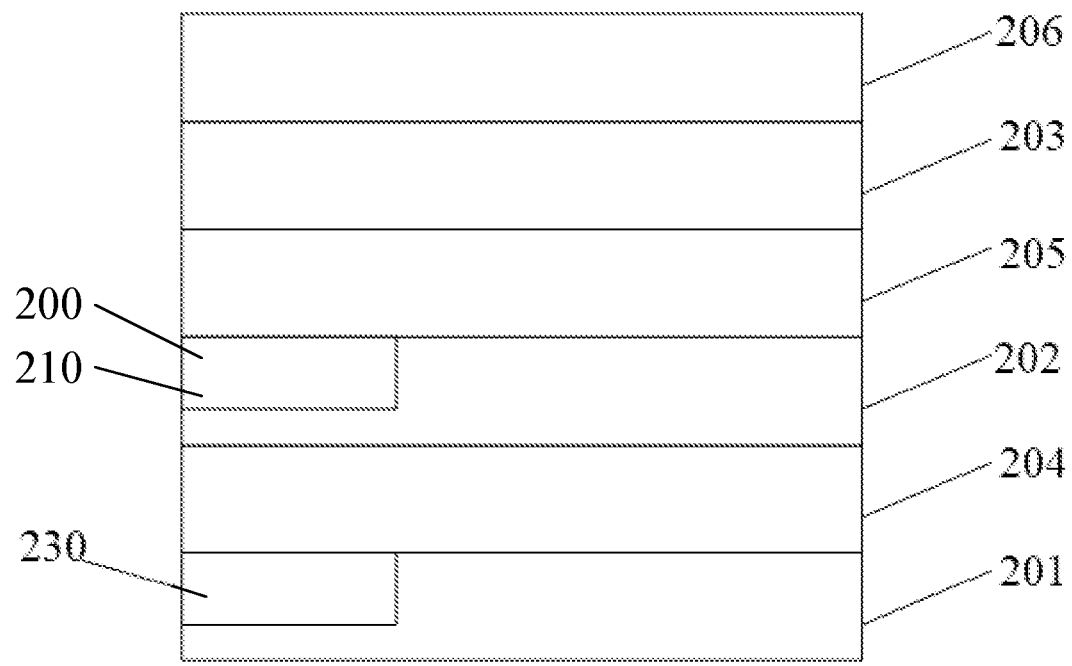
FIG. 8 is a fourth sectional view along A-A' of the flexible substrate of FIG. 4.

Specifically, the first electromagnetic touch coil 200 and the second electromagnetic touch coil 210 can be disposed in different layers or in a same layer, that is, when the flexible substrate 20 includes the first flexible substrate layer 201 and the second flexible substrate layer 202 disposed in different layers, as shown in FIG. 5 or FIG. 6, the first electromagnetic touch coil 200 and the second electromagnetic touch coil 210 can be disposed in one layer of the first flexible substrate layer 201 and the second flexible substrate layer 202, respectively, or, as shown in FIG. 7 or FIG. 8, the first electromagnetic touch coil 200 and the second electromagnetic touch coil 210 can be both disposed in the first flexible substrate layer 201 or the second flexible substrate layer 202.

It should be noted that the first flexible substrate layer 201 and the second flexible substrate layer 202 are insulated from each other, so that when the first electromagnetic touch coil 200 and the second electromagnetic touch coil 210 are disposed in one of the first flexible substrate layer 201 and the second flexible substrate layer 202, respectively, the first electromagnetic touch coil 200 and the second electromagnetic touch coil 210 can be insulated from each other.

It should also be noted that when the first electromagnetic touch coil 200 and the second electromagnetic touch coil 210 are disposed in the same layer, in order to ensure a mutual insulation between the first electromagnetic touch coil 200 and the second electromagnetic touch coil 210, a metal bridge 230 needs to be disposed at an intersection of the first electromagnetic touch coil 200 and the second electromagnetic touch coil 210, and the metal bridge 230 is disposed in a different layer from the first electromagnetic touch coil 200 and the second electromagnetic touch coil 210, and is configured to bridge the first electromagnetic touch coil 200 and the second electromagnetic touch coil 210.

Based on this, as shown in FIG. 7, the first electromagnetic touch coil 200 and the second electromagnetic touch coil 210 are both disposed in the first flexible substrate layer 201, and the metal bridge 230 is disposed in the second flexible substrate layer 202, or as shown in FIG. 8, the first electromagnetic touch coil 200 and the second electromagnetic touch coil 210 are both disposed in the second flexible substrate layer 202, and the metal bridge 230 is disposed in the first flexible substrate layer 201.

In some embodiments, the flexible substrate 20 also includes a bottom shielding metal layer 203 disposed in a different layer from the first flexible substrate layer 201 and the second flexible substrate layer 202, and the metal bridge 230 can also be disposed in the bottom shielding metal layer 203; the first electromagnetic touch coil 200 and the second electromagnetic touch coil 210 are both disposed in the first flexible substrate layer 201 or the second flexible substrate layer 202, and the metal bridge 230 is disposed in the bottom shielding metal layer 203.

Figure 9:
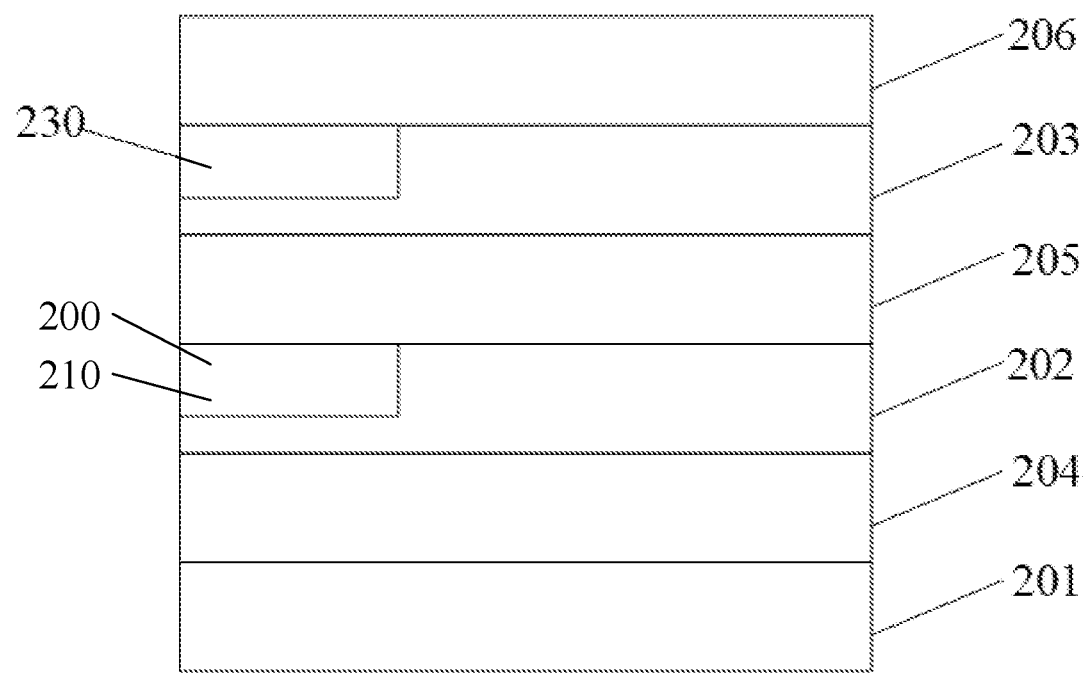
FIG. 9 is a fifth sectional view along A-A' of the flexible substrate of FIG. 4.

It should be noted that due to a limited space of the bottom shielding metal layer 203, it is only suitable for disposing metal bridges and not suitable for disposing electromagnetic touch coils with complex patterns. As shown in FIG. 9, when the metal bridge 230 is disposed in the bottom shielding metal layer 203 and the second flexible substrate layer 202 is disposed between the bottom shielding metal layer 203 and the first flexible substrate layer 201, if the first electromagnetic touch coil 200 and the second electromagnetic touch coil 210 are jointly disposed in the first flexible substrate layer 201, then the metal bridge 230 needs to cross the second flexible substrate layer 202 to connect with the first electromagnetic touch coil 200 and the second electromagnetic touch coil 210 disposed in the first flexible substrate layer 201, resulting in a large spacing between the metal bridge 230 and the electromagnetic touch coils, so that an insulation between the first electromagnetic touch coil 200 and the second electromagnetic touch coil 210 easily fails. Therefore, when the metal bridge 230 is disposed in the bottom shielding metal layer 203, and the second flexible substrate layer 202 is disposed between the bottom shielding metal layer 203 and the first flexible substrate layer 201, it is better for the first electromagnetic touch coil 200 and the second electromagnetic touch coil 210 to be jointly disposed in the second flexible substrate layer 202. At this time, a spacing between the metal bridge 230 and the first electromagnetic touch coil 200 and a spacing between the metal bridge 230 and the second electromagnetic touch coil 210 are both small, so as to ensure a good insulation between the first electromagnetic touch coil 200 and the second electromagnetic touch coil 210. That is, when the metal bridge 230 is disposed in the bottom shielding metal layer 203, the first electromagnetic touch coil 200 and the second electromagnetic touch coil 210 are preferably disposed in a flexible substrate layer close to the bottom shielding metal layer 203.

Further, as shown in FIG. 5 to FIG. 9, in the embodiment of the present invention, a first spacer layer 204 is further disposed between the first flexible substrate layer 201 and the second flexible substrate layer 202, a photoresist layer 205 is further disposed between the first flexible substrate layer 201 and the bottom shielding metal layer 203, and a second spacer layer 206 is further disposed above the bottom shielding metal layer 203.

Based on the above embodiment, the electromagnetic touch coils and the metal bridge are made of corresponding masks. When the first electromagnetic touch coil 200 and the second electromagnetic touch coil 210 are disposed in the first flexible substrate layer 201 and the second flexible substrate layer 202, respectively, the first electromagnetic touch coil 200 and the second electromagnetic touch coil 210 are prepared by two different masks; when the first electromagnetic touch coil 200 and the second electromagnetic touch coil 210 are both disposed in the first flexible substrate layer 201 or the second flexible substrate layer 202, the first electromagnetic touch coil 200 and the second electromagnetic touch coil 210 are prepared by a same mask, and the metal bridge 230 is prepared by another mask.

Based on the above embodiments, an embodiment of the present invention also provides a touch display device, which includes the touch display module described above. Wherein the touch display device has a same structure and same beneficial effects as the touch display module; since the above embodiments have described the touch display module in detail, they will not be repeated here.

It can be understood that for those skilled in the art, equivalent replacement or changes can be made according to the technical scheme of the application and its inventive concept, and all these changes or replacements should belong to the protection scope of the claims attached to the application.

What is claimed is:

1. A touch display module, comprising a touch layer and a flexible substrate being disposed in different layers; wherein the touch layer comprises a capacitive touch electrode, and the capacitive touch electrode is configured to determine a plane coordinate of a finger or a capacitive pen; and the flexible substrate comprises an electromagnetic touch coil, and the electromagnetic touch coil is configured to determine a plane coordinate of an electromagnetic pen; wherein the electromagnetic touch coil comprises a first electromagnetic touch coil extending along a first direction and forming a loop and a second electromagnetic touch coil extending along a second direction and forming a loop;

wherein the flexible substrate comprises a first flexible substrate layer and a second flexible substrate layer disposed in different layers; and the first electromagnetic touch coil and the second electromagnetic touch coil are disposed in the first flexible substrate layer and the second flexible substrate layer, respectively; or, the first electromagnetic touch coil and the second electromagnetic touch coil are both disposed in the first flexible substrate layer or the second flexible substrate layer.

2. The touch display module according to claim 1, wherein the capacitive touch electrode comprises a first capacitive touch electrode extending along a first direction and a second capacitive touch electrode extending along a second direction, and the first direction and the second direction are perpendicular to each other; wherein one of the first capacitive touch electrode and the second capacitive touch electrode is a transmitting electrode, and another one is a receiving electrode.

3. The touch display module according to claim 1, wherein the first direction and the second direction are perpendicular to each other; wherein one of the first electromagnetic touch coil and the second electromagnetic touch coil is a transmitting coil, and another one is a receiving coil.

4. The touch display module according to claim 1, wherein the first electromagnetic touch coil and the second electromagnetic touch coil are both disposed in the first flexible substrate layer, and a metal bridge used for insulating at an intersection of the first electromagnetic touch coil and the second electromagnetic touch coil is disposed in the second flexible substrate layer; or, the first electromagnetic touch coil and the second electromagnetic touch coil are both disposed in the second flexible substrate layer, and the metal bridge used for insulating at the intersection of the first electromagnetic touch coil and the second electromagnetic touch coil is disposed in the first flexible substrate layer.

5. The touch display module according to claim 4, wherein when the first electromagnetic touch coil and the second electromagnetic touch coil are both disposed in the first flexible substrate layer or the second flexible substrate layer, the first electromagnetic touch coil and the second electromagnetic touch coil are prepared by a same mask, and the metal bridge is prepared by another mask.

6. The touch display module according to claim 1, wherein the flexible substrate further comprises a bottom shielding metal layer disposed in a layer different from the first flexible substrate layer and the second flexible substrate layer;

the first electromagnetic touch coil and the second electromagnetic touch coil are both disposed in the first flexible substrate layer or the second flexible substrate layer, and a metal bridge used for insulating at an intersection of the first electromagnetic touch coil and the second electromagnetic touch coil is disposed in the bottom shielding metal layer.

7. The touch display module according to claim 1, wherein when the first electromagnetic touch coil and the second electromagnetic touch coil are disposed in the first flexible substrate layer and the second flexible substrate layer, respectively, the first electromagnetic touch coil and the second electromagnetic touch coil are prepared by two different masks.

8. The touch display module according to claim 1, wherein materials of the capacitive touch electrode and the electromagnetic touch coil are both indium tin oxide.

9. The touch display module according to claim 1, wherein the first electromagnetic touch coil comprises two first electromagnetic touch electrodes disposed along the first direction and a first electromagnetic connection electrode disposed along the second direction used for connecting the two first electromagnetic touch electrodes; and the second electromagnetic touch coil comprises two second electromagnetic touch electrodes disposed along the second direction and a second electromagnetic connection electrode disposed along the first direction used for connecting the two second electromagnetic touch electrodes.

10. The touch display module according to claim 1, wherein the flexible substrate further comprises:

a first spacer layer disposed between the first flexible substrate layer and the second flexible substrate layer;

a photoresist layer disposed at a side of the second flexible substrate layer away from the first spacer layer;

a bottom shielding metal layer disposed at a side of the photoresist layer away from the second flexible substrate layer, wherein a metal bridge used for insulating at an intersection of the first electromagnetic touch coil and the second electromagnetic touch coil is disposed in the bottom shielding metal layer; and a second spacer layer disposed at a side of the bottom shielding metal layer away from the photoresist layer.

11. A touch display device, comprising a touch display module, and the touch display module comprising a touch layer and a flexible substrate being disposed in different layers; wherein the touch layer comprises a capacitive touch electrode, and the capacitive touch electrode is configured to determine a plane coordinate of a finger or a capacitive pen; and the flexible substrate comprises an electromagnetic touch coil, and the electromagnetic touch coil is configured to determine a plane coordinate of an electromagnetic pen; wherein the electromagnetic touch coil comprises a first electromagnetic touch coil extending along a first direction and forming a loop and a second electromagnetic touch coil extending along a second direction and forming a loop;

wherein the flexible substrate comprises a first flexible substrate layer and a second flexible substrate layer disposed in different layers; and the first electromagnetic touch coil and the second electromagnetic touch coil are disposed in the first flexible substrate layer and the second flexible substrate layer, respectively; or, the first electromagnetic touch coil and the second electromagnetic touch coil are both disposed in the first flexible substrate layer or the second flexible substrate layer.

12. The touch display device according to claim 11, wherein the capacitive touch electrode comprises a first capacitive touch electrode extending along a first direction and a second capacitive touch electrode extending along a second direction, and the first direction and the second direction are perpendicular to each other; wherein one of the first capacitive touch electrode and the second capacitive touch electrode is a transmitting electrode, and another one is a receiving electrode.

13. The touch display device according to claim 11, wherein the first direction and the second direction are perpendicular to each other; wherein one of the first electromagnetic touch coil and the second electromagnetic touch coil is a transmitting coil, and another one is a receiving coil.

14. The touch display device according to claim 11, wherein the first electromagnetic touch coil and the second electromagnetic touch coil are both disposed in the first flexible substrate layer, and a metal bridge used for insulating at an intersection of the first electromagnetic touch coil and the second electromagnetic touch coil is disposed in the second flexible substrate layer; or, the first electromagnetic touch coil and the second electromagnetic touch coil are both disposed in the second flexible substrate layer, and the metal bridge used for insulating at the intersection of the first electromagnetic touch coil and the second electromagnetic touch coil is disposed in the first flexible substrate layer.

15. The touch display device according to claim 14, wherein when the first electromagnetic touch coil and the second electromagnetic touch coil are both disposed in the first flexible substrate layer or the second flexible substrate layer, the first electromagnetic touch coil and the second electromagnetic touch coil are prepared by a same mask, and the metal bridge is prepared by another mask.

16. The touch display device according to claim 11, wherein the flexible substrate further comprises a bottom shielding metal layer disposed in a layer different from the first flexible substrate layer and the second flexible substrate layer;
the first electromagnetic touch coil and the second electromagnetic touch coil are both disposed in the first flexible substrate layer or the second flexible substrate layer, and a metal bridge used for insulating at an intersection of the first electromagnetic touch coil and the second electromagnetic touch coil is disposed in the bottom shielding metal layer.

17. The touch display device according to claim 11, wherein when the first electromagnetic touch coil and the second electromagnetic touch coil are disposed in the first flexible substrate layer and the second flexible substrate layer, respectively, the first electromagnetic touch coil and the second electromagnetic touch coil are prepared by two different masks.

18. The touch display device according to claim 11, wherein materials of the capacitive touch electrode and the electromagnetic touch coil are both indium tin oxide.

19. The touch display device according to claim 11, wherein the first electromagnetic touch coil comprises two first electromagnetic touch electrodes disposed along the first direction and a first electromagnetic connection electrode disposed along the second direction used for connecting the two first electromagnetic touch electrodes; and
the second electromagnetic touch coil comprises two second electromagnetic touch electrodes disposed along the second direction and a second electromagnetic connection electrode disposed along the first direction used for connecting the two second electromagnetic touch electrodes.

20. The touch display device according to claim 11, wherein the flexible substrate further comprises:
a first spacer layer disposed between the first flexible substrate layer and the second flexible substrate layer;
a photoresist layer disposed at a side of the second flexible substrate layer away from the first spacer layer;
a bottom shielding metal layer disposed at a side of the photoresist layer away from the second flexible substrate layer, wherein a metal bridge used for insulating at an intersection of the first electromagnetic touch coil and the second electromagnetic touch coil is disposed in the bottom shielding metal layer; and
a second spacer layer disposed at a side of the bottom shielding metal layer away from the photoresist layer.

* * * * *